A. HOLSTEIN.
SNAP FASTENER.
APPLICATION FILED SEPT. 11, 1915.

1,233,235.           Patented July 10, 1917.

INVENTOR
Alexander Holstein.

WITNESS
F.J. Hartman

BY
Fenton & Blount

ATTORNEYS

UNITED STATES PATENT OFFICE.

ALEXANDER HOLSTEIN, OF PHILADELPHIA, PENNSYLVANIA.

SNAP-FASTENER.

1,233,235.    Specification of Letters Patent.    Patented July 10, 1917.

Application filed September 11, 1915. Serial No. 50,117.

*To all whom it may concern:*

Be it known that I, ALEXANDER HOLSTEIN, a citizen of the United States, and a resident of Philadelphia, county of Philadelphia, and State of Pennsylvania, have invented certain new and useful Improvements in Snap-Fasteners, of which the following is a specification, reference being had to the accompanying drawing.

Among the principal objects of my invention are to provide a snap fastener for use in connection with articles of wearing apparel and other similar purposes, which shall be simple in construction and which may be manufactured at a low cost, and in which the socket member shall be composed wholly of suitable wire; and to provide a snap fastener which shall serve when in operation to securely unite the various plies of fabric or other material in connection with which it may be used, and which shall permit of the ready separation of the members of the fastener when it is desired to separate the plies to which they may be attached.

A further object of my invention is to provide a snap fastener having the foregoing characteristics which may, if desired, be readily sewed or otherwise attached to the fabric by machinery, thus materially reducing the cost of the garment in connection with which it may be utilized.

Still further objects of my invention are to provide a snap fastener which shall not be liable to get out of order or to be damaged when in use in such manner as to materially affect the proper operation of the fastener.

My invention further includes all of the other various novel objects and features of construction and arrangement hereinafter more definitely specified.

Figure 1:
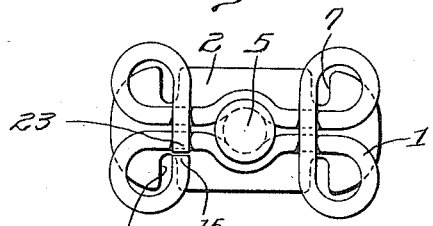
Figure 2:
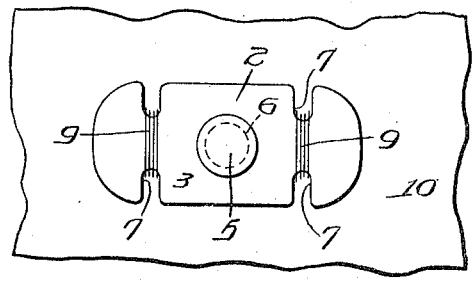
Figure 3:
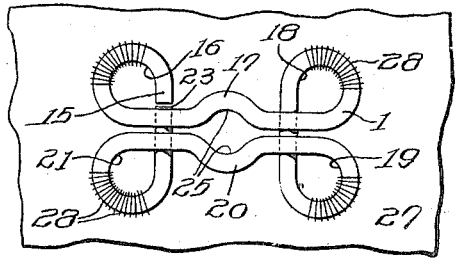
Figure 4:
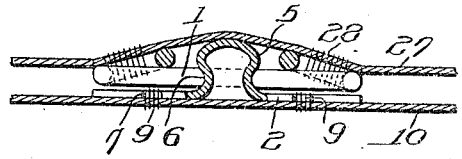

In the accompanying drawing is illustrated a preferred embodiment of my invention, Figure 1 being a top plan view of the snap fastener in assembled or operative position; Fig. 2 a plan view of the stud member of the fastener in position upon a piece of fabric; Fig. 3 a plan view of the socket member of the fastener also in position on a piece of fabric, and Fig. 4 a central vertical section of the fastener with the members thereof respectively attached to two pieces of fabric and serving to hold the same together, certain parts of the device in this figure being shown in elevation for the sake of clearness.

Referring now to that embodiment of the invention shown in the drawing, the same may comprise a socket or spring member 1, and a plate or stud member 2, which latter may consist of a plate 3 of any suitable or desired form provided approximately at its center with an outwardly projecting stud or ball having the head 5 surmounting the neck 6 which is of somewhat smaller diameter than the head and forms a connection between the head and the plate in a manner well-known to those familiar with the art. In practice I prefer to form the plate 3 of substantially oblong shape with rounded corners and to provide the same with transverse, inwardly extending slots or indentations 7 adjacent each end for the reception of the thread 9 which may be passed over those portions of the plate lying between the ends of the slots to secure the plate to the fabric 10. As a plate formed in this manner may be readily sewed to the fabric by a certain class of sewing machinery utilized in the manufacture of clothing, the cost of attaching the fastener is thereby greatly lessened in comparison with the cost of doing the work by hand, while the relatively extended surface of the plate in contact with the fabric serves to steady the same thereon and to assist the thread in securely maintaining it in position.

The socket or spring member 1 of the fastener, is preferably formed from a single continuous piece of wire having a certain amount of inherent resiliency, and I find that wire having properties substantially similar to the wire used in the manufacture of hooks and eyes is well adapted for the purpose. In forming the socket member the wire, for example beginning at the point 15, is bent to form the substantially circular loop or eye 16, is then directed longitudinally for a short distance, then diverged slightly outwardly and inwardly as at 17 to form a preferably substantially semi-circular bend, again directed longitudinally, and thereafter bent to form the loop or eye 18. Thence the wire is directed transversely over the longitudinal portion adjacent eye 18, and thereafter formed into the loop 19;

thence directed longitudinally backwardly and beneath the transverse portion, then out and in at 20 to correspond with the bend 17; again directed longitudinally, then bent to form loop or eye 21, and thereafter crossed over the longitudinal portions of the wire adjacent eyes 16 and 21, and terminated at 23 adjacent the point 15. Of course if desired, the steps in the operation of bending the wire to form the socket member, may be carried out in reverse order from that described; that is, by beginning at point 23 and ending at point 15.

It will be evident that by bending the wire as just described, a socket member will be formed substantially oblong in planular outline and presenting a plurality of attaching eyes or loops, one adjacent each corner, and that preferably midway between the ends of the socket member an opening 25 will be defined between the two longitudinally extending portions of the wire, the normal diameter of the opening being preferably substantially equal to that of the neck 6 of the stud. I prefer to so direct the wire in forming the socket member that the opening 25 shall be of substantially circular configuration so as to properly engage the neck of the stud when the latter, as is usual, is of cylindrical, or approximately cylindrical, form, but, of course, should it be desired to utilize some other form of stud or neck the shape of the opening should be so modified as to be adapted for suitable engagement therewith.

The socket member may preferably be secured to the fabric 27 in an inverted position from that shown in Fig. 1 by suitable stitching 28 extending over the portions of the wire defining the loops and through the loops or eyes 16, 18, 19 and 21 themselves, so that the transversely extending portions of the wire will, as clearly shown in Fig. 3, lie next to the surface of the fabric, although in certain cases it may be desirable to attach the socket member to the fabric in reverse position. Owing to the configuration of the loops or eyes the socket member may be readily attached to the fabric by means of suitable sewing machines or the like as hitherto described in connection with the stud member, thus greatly facilitating this operation and reducing the cost thereof, the generally oblong contour of the socket member assisting in securely positioning it on the material and tending to prevent its displacement thereon after its attachment thereto.

When it is desired to unite the separate pieces of material to which the plate member and socket member are respectively attached as heretofore described, the stud of the former is forced through the opening 25 in the latter, the longitudinal portions of the wire forming the socket member springing or giving apart sufficiently to permit the larger portion of the stud to pass through the opening, after which the wires again contract to normal position and snugly surround the neck 6 of the stud. The plate member will thus be securely held in operative connection with the socket member, and the respective pieces of material to which the members are attached similarly secured together, until the members of the fastener are pulled apart with sufficient force to cause the longitudinal wires to again spring apart to permit the passage of the enlarged portion of the stud.

While I have described with considerable particularity a preferred method of bending the wire to form the socket member, I do not desire to limit myself solely thereto, as it will be evident that other methods depending, for example, upon the type or style of bending machine employed to form the socket member may be utilized as desired; and further, that the shape of the latter may be modified and the number of loops or eyes employed increased or decreased, and that other changes and modifications may be made in the details of the members composing the fastener without departing from the spirit and scope of the invention as defined in the appended claims.

Having thus described my invention, I claim and desire to protect by Letters Patent of the United States:

1. A stud-receiving socket formed of a single piece of wire bent to provide two pairs of oppositely disposed eyes, oppositely bowed stud-engaging sections located intermediate the pairs of eyes and constituting a stud-receiving loop, and a pair of spaced cross bars extending beneath transversely of the bowed stud-engaging sections at opposite ends of the loop, whereby said bars act as stops to prevent a stud from passing through said ends of the loop.

2. A stud-receiving socket formed from a single piece of wire bent to form a pair of substantially parallel cross bars, a pair of eyes at each cross bar, and an intermediate bowed section forming a stud-receiving loop over-lying the spaced parallel cross bars, said cross bars being adapted to contact with an inserted stud and to retain such stud against lateral displacement through the ends of the loop.

3. A stud-receiving socket formed of a single piece of wire bent to define a plurality of oppositely disposed attaching eyes, oppositely bowed stud engaging sections located intermediate the attaching eyes and forming a stud-receiving loop and a section extending transversely of said stud engaging sections and forming a stop to prevent lateral displacement of a stud inserted in said loop.

4. A stud-receiving socket formed of a single piece of wire bent to define two pair of oppositely disposed attaching eyes, a pair of oppositely disposed longitudinally extending bowed sections forming a stud-receiving socket located intermediate of said pairs of eyes, and a section extending transversely of said bowed sections and forming a stop adapted to limit the endwise movement of a stud inserted in said socket.

In witness whereof, I have hereunto set my hand this ninth day of September, A. D. 1915.

ALEXANDER HOLSTEIN.